United States Patent
Ukkola et al.

(10) Patent No.: US 11,283,668 B2
(45) Date of Patent: *Mar. 22, 2022

(54) METHOD AND APPARATUS IN A WEB SERVICE SYSTEM

(71) Applicant: ARM FINLAND OY, Oulu (FI)

(72) Inventors: Sampo Ukkola, Oulu (FI); Zachary Shelby, Oulu (FI)

(73) Assignee: PELION (FINLAND) OY

(*) Notice: Subject to any disclaimer, the term of this patent is extended or adjusted under 35 U.S.C. 154(b) by 57 days.

This patent is subject to a terminal disclaimer.

(21) Appl. No.: 16/853,335

(22) Filed: Apr. 20, 2020

(65) Prior Publication Data

US 2020/0252259 A1 Aug. 6, 2020

Related U.S. Application Data

(63) Continuation of application No. 13/942,738, filed on Jul. 16, 2013, now Pat. No. 10,630,528.

(30) Foreign Application Priority Data

Jul. 17, 2012 (FI) .................................... 20125798

(51) Int. Cl.

| | |
|---|---|
| *H04L 29/08* | (2006.01) |
| *H04W 4/70* | (2018.01) |
| *H04L 67/1074* | (2022.01) |
| *H04W 4/38* | (2018.01) |
| *H04W 4/80* | (2018.01) |

(52) U.S. Cl.
CPC ......... *H04L 29/08459* (2013.01); *H04W 4/70* (2018.02); *H04W 4/38* (2018.02); *H04W 4/80* (2018.02)

(58) Field of Classification Search
CPC H04W 4/38; H04W 4/70; H04W 4/80; H04L 29/08459

See application file for complete search history.

(56) References Cited

U.S. PATENT DOCUMENTS

| | | |
|---|---|---|
| 6,795,404 B2 | 9/2004 | Slemmer et al. |
| 2005/0127196 A1 | 6/2005 | Gottlieb |
| 2006/0028997 A1 | 2/2006 | McFarland |
| 2006/0161645 A1 | 7/2006 | Moriwaki et al. |
| 2007/0210916 A1 | 9/2007 | Ogushi et al. |
| 2008/0055113 A1 | 3/2008 | Muro et al. |

(Continued)

OTHER PUBLICATIONS

Z. Shelby et al., CoRE Working Group Internet—Draft, CoRE Resource Directory, draft-shelby-core-resource-directory-04, Jul. 16, 2012, Sections 1, 5.2 and 7 .2.

(Continued)

*Primary Examiner* — Brian P Cox

(74) *Attorney, Agent, or Firm* — Barnes & Thornburg LLP

(57) ABSTRACT

A method and an apparatus for realizing a web service system. The solution includes communicating with nodes operationally connected to a server using a binary web service, the nodes having one or more resources. The server receives from a node a registration message having information on the address of the node, an ID of one or more resources of the node, and an indication that the node is configured to send autonomously information whenever a resource of a node changes, the information having the ID of the resource.

17 Claims, 2 Drawing Sheets

(56) References Cited

U.S. PATENT DOCUMENTS

| | | |
|---|---|---|
| 2008/0188963 A1 | 8/2008 | McCoy |
| 2008/0240160 A1 | 10/2008 | Ishii |
| 2008/0253327 A1 | 10/2008 | Kohvakka et al. |
| 2008/0279155 A1 | 11/2008 | Pratt, Jr. et al. |
| 2009/0125918 A1 | 5/2009 | Kansal et al. |
| 2009/0287456 A1 | 11/2009 | Tran et al. |
| 2010/0125641 A1* | 5/2010 | Shelby .............. H04L 69/04 709/206 |
| 2010/0138470 A1 | 6/2010 | McCoy |
| 2010/0161630 A1 | 6/2010 | Moriwaki et al. |
| 2010/0199188 A1 | 8/2010 | Abu-Hakima et al. |
| 2010/0332190 A1 | 12/2010 | Yamaguchi et al. |
| 2011/0090334 A1 | 4/2011 | Hicks, III et al. |
| 2011/0149844 A1 | 6/2011 | G. et al. |
| 2011/0182232 A1 | 7/2011 | Padmanabh et al. |
| 2011/0205965 A1 | 8/2011 | Sprigg et al. |
| 2011/0137673 A1 | 12/2011 | Shelby |
| 2012/0057581 A1 | 3/2012 | An et al. |
| 2012/0071168 A1 | 3/2012 | Tomici et al. |
| 2012/0083204 A1 | 4/2012 | Martin |
| 2012/0092650 A1 | 4/2012 | Gunn, III et al. |
| 2012/0131095 A1 | 5/2012 | Luna et al. |
| 2012/0158335 A1 | 6/2012 | Donovan et al. |
| 2012/0176938 A1 | 7/2012 | Padmanagh et al. |
| 2012/0176976 A1 | 7/2012 | Wells |
| 2012/0197852 A1 | 8/2012 | Dutta et al. |
| 2012/0220893 A1 | 8/2012 | Benzel et al. |
| 2012/0290717 A1 | 11/2012 | Luna |
| 2012/0310559 A1 | 12/2012 | Taft |
| 2012/0314608 A1 | 12/2012 | Okuno et al. |
| 2013/0046881 A1 | 2/2013 | Seelman et al. |
| 2013/0089103 A1 | 4/2013 | Hersent |
| 2013/0128786 A1 | 5/2013 | Sultan et al. |
| 2013/0160003 A1 | 6/2013 | Mann et al. |
| 2013/0179557 A1 | 7/2013 | Bian et al. |
| 2013/0219064 A1 | 8/2013 | Zhang et al. |
| 2013/0262576 A1 | 10/2013 | Foti |
| 2014/0006586 A1 | 1/2014 | Hong et al. |
| 2014/0126581 A1 | 5/2014 | Wang et al. |
| 2014/0207476 A1 | 7/2014 | Fong et al. |
| 2014/0207869 A1 | 7/2014 | Savolainen |
| 2014/0341109 A1 | 11/2014 | Cartmell et al. |
| 2014/0369251 A1 | 12/2014 | Zhang |

OTHER PUBLICATIONS

K. Harthe, CoRE Working Group Internet—Draft, Observing Resources in CoAP, draft-letf-core-observe-05, Jul. 16, 2012, Sections 1 and 7.

* cited by examiner

METHOD AND APPARATUS IN A WEB SERVICE SYSTEM

PRIORITY CLAIM

This application is a Continuation Application of U.S. application Ser. No. 13/942,738 filed Jul. 16, 2013, which claims priority to Finnish Patent Application No. 20125798, filed 17 Jul. 2012, the disclosure of which is incorporated herein by reference in its entirety.

FIELD

Disclosed embodiments relate to a method and an apparatus in a web service system. In particular, disclosed embodiments relate to accessing and registering resources in networks comprising machine-to machine systems.

BACKGROUND

The following description of background art may include insights, discoveries, understandings or disclosures, or associations together with disclosures not known to the relevant art prior to the present disclosed embodiments but provided by the disclosed embodiments. Some of such contributions may be specifically pointed out below, whereas other such contributions will be apparent from their context.

In modern communication and computer networks, management of network infrastructure equipment, such as personal computers, servers and printers, is an important part of the operation of the network. In a large network comprising tens and hundreds of devices the management of devices requires a systematical approach to be efficient or even possible. Today, the management of infrastructure is performed using standards like the Simple Network Management Protocol (SNMP) and Netconf. These protocols enable the monitoring and possible control of devices connected to the network in a controlled and efficient manner. These methods work well in an Ethernet-based office information technology (IT) environment comprising devices having processor power. Power consumption, traffic overhead and implementation complexity are not a concern in this environment.

Enterprises are rapidly connecting Machine-to-Machine (M2M) systems into their backend IT infrastructure for e.g. energy monitoring, remote machine monitoring, building automation and asset management. M2M systems often include very simple, cheap, battery powered devices connected via deep low-bandwidth access networks. The scale of devices in an M2M network is also massively different, including even up to millions of devices in a single management domain.

More recently, as machine-to-machine devices have become IP enabled, systems have become more open by using IP as a networking protocol, but in order to keep the system efficient, they employ proprietary protocols.

Especially in large M2M networks with large numbers of devices with small processing power and minimum power consumption it is important to utilize efficient solutions to reduce the communication overhead and storage capacity. This applies both to backend servers and M2M devices.

SUMMARY

Disclosed embodiments provide an improved solution for managing Machine-to-Machine systems and accessing resources offered by M2M devices.

At least one disclosed embodiment provides an apparatus, in a web service system, comprising: at least one processor; and at least one memory including computer program code, the at least one memory and the computer program code configured to, with the at least one processor, cause the apparatus at least to perform: communicate with nodes operationally connected to the apparatus using a binary web service, the nodes comprising one or more resources, receive from a node a registration message comprising information on the address of the node, an ID of one or more resources of the node, and an indication that the node is configured to send autonomously information whenever a resource of a node changes, the information comprising the ID of the resource.

Another disclosed embodiment provides an apparatus, comprising at least one processor; and at least one memory including computer program code, the at least one memory and the computer program code configured to, with the at least one processor, cause the apparatus at least to perform: control connections to one or more resources providing information; store a unique ID for each resource; communicate utilizing a binary web service interface with a network element operationally connected to the apparatus using a binary web service, send the network element a registration message comprising information on the address of the node, the ID of the one or more resources, and an indication that the apparatus is configured to send autonomously information whenever a resource, the information comprising the ID of the resource.

Yet another disclosed embodiment provides a method, in a web service system, comprising: communicating with nodes operationally connected to the apparatus using a binary web service, the nodes comprising one or more resources, receiving from a node a registration message comprising information on the address of the node, an ID of one or more resources of the node, and an indication that the node is configured to send autonomously information whenever a resource of a node changes, the information comprising the ID of the resource.

Still another disclosed embodiment provides a method, comprising: controlling connections to one or more resources providing information; storing a unique ID for each resource; communicating utilizing a binary web service interface (502) with a network element operationally connected to the apparatus using a binary web service, and sending the network element a registration message comprising information on the address of the node, the ID of the one or more resources, and an indication that the apparatus is configured to send autonomously information whenever a resource, the information comprising the ID of the resource.

BRIEF DESCRIPTION OF THE DRAWINGS

Disclosed embodiments are described below, by way of example only, with reference to the accompanying drawings, in which.

DETAILED DESCRIPTION OF THE DISCLOSED EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Data exchange between programs and computers is a vital element. Different programs, computers and processors may exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

The exchanges of interoperable messages using APIs (Application Program Interfaces) provided by servers on the Internet are realized by using web services. A web service can be realized in many ways, usually by using a REST (Representational State Transfer) design with the built-in features of a web protocol like HTTP and payload encoding with Extensible Markup Language (XML), or realized as a remote procedure call via SOAP (Simple Object Access Protocol).

Low-power wireless networks, such as IEEE 802.15.4 based embedded and sensor networks, have extremely limited resources for transmitting packets. These networks are very energy-efficient, and the chip technology is cheap. For this reason the technology is making its way to embedded devices very quickly for automation, measurement, tracking and control, for example.

In low-power wireless networks, current web service technologies are far too complex (headers, content parsing) and heavy (large header and content overhead). Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

Figure 1:
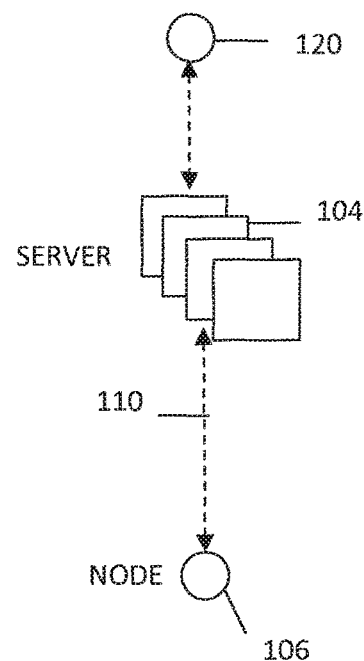
FIG. 1 illustrates an example of a web service system architecture to which disclosed embodiments may be applied.

FIG. 1 illustrates an example of a web service system architecture to which disclosed embodiments may be applied. In at least one disclosed embodiment, the system is configured to efficiently enable one or more backend web applications 120 to make use of constrained embedded nodes 106 over constrained networks 110. The communication is based on IP and a RESTful web service architecture end-to-end, for example.

The architecture consists of a server or servers 104, which hosts backend components of the system. Such a server can be realized on anything from a standard personal computer (PC) to a server cloud. The server components can be located on the same apparatus, or distributed across a cluster. Disclosed embodiments are designed to scale from small M2M systems (1000s of nodes) to very large M2M systems (100s of millions of nodes).

The server 104 may provide a web service interface to web applications 120 that make use of embedded node resources. The web application may be an application run in a browser or in standalone software. The application or software may be run in an apparatus capable of Internet communication. The server 104 is configured to communicate using optimized embedded web service algorithms and protocols with nodes 106 over the M2M interface 110. In another disclosed embodiment, the functions of this interface include registration and resource requests. The architecture includes the ability to cluster the backend server across multiple physical or virtual machines (called private or public cloud computing).

In at least one disclosed embodiment, a local proxy component (not shown) may be utilized between the server 104 and the nodes 106 to distribute parts of the intelligence of the server to the edges of the architecture.

The constrained nodes 106 in the system have limited memory and processing capabilities, may sleep most of the time, and often operate using a constrained network technology. Nodes communicate with servers 104 using an M2M interface 110. Each node contains resource registration related functionality. The nodes comprise one or more resources which may be utilized by the web applications 120, for example.

The embedded M2M devices or nodes 106 that are being managed by the server 104 can be connected to the server via IP directly (or via a proxy). The interface 110 between the node and the server is realized using a binary web service protocol over IP. The M2M devices 106 may reside in a constrained network over which traditional management protocols would be too inefficient. The constrained or low-power wireless network may be a multihop network comprising a set of wireless low-power nodes. In this simplified example, one node 106 is illustrated.

In another disclosed embodiment, the wireless links in the wireless network 110 may be realized by using IEEE 802.15.4, with Internet Protocol v6 (6lowpan), IEEE 802.15.4 with ZigBee, Bluetooth or Bluetooth Ultra Low Power (ULP), Low Power Wireless Local Area Network, proprietary low-power radio, cellular radio system or any other system suitable for low-power transmission. IEEE stands for the Institute of Electrical and Electronics Engineers.

Figure 2:
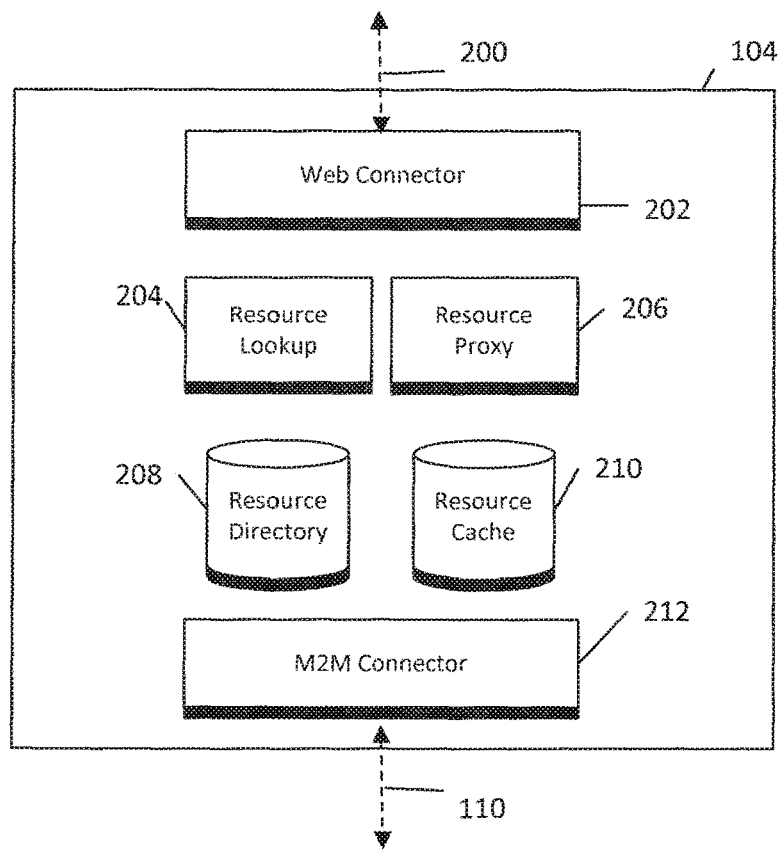
FIG. 2 illustrates an example of a network management system server.

FIG. 2 illustrates an example of a server 104. The server may consist of several components. The server may be used by one or more web applications over a web interface 200. The interface 200 is typically realized over HTTP with XML or JSON payload content where JSON (JavaScript Object Notation) is a known data-interchange format. Mentioned realizations are merely examples as the architecture of the server is transparent to payload type. Interaction of the web applications with the server over the interface uses the REST paradigm. Alternative protocols may be supported, e.g. JMS (Java Message Service) for communication with enterprise Java components, or CoAP when efficiency is needed e.g. when communicating with mobile devices. In at least one disclosed embodiment, the server may comprise a Web Connector 202 for each protocol supported by the interface. The Web Connectors realize abstract REST interfaces used by the other server components to access the different protocols available. This makes it possible for to support a new protocol without changing other server components.

The communication with constrained nodes 106 are realized in the server using an M2M interface 110, realized using embedded web services (binary web protocol and payload) for example with the CoAP protocol. Other protocols such as SMS or optimized HTTP are also supported. In another disclosed embodiment, each protocol interface is realized in the server using an M2M Connector 212. The Web Connectors 202 and M2M Connectors 212 may be realized using a processor and a storing device such as a hard disc drive and a suitable application, for example.

The server further comprises a Resource Directory 208. The server is configured to receive registrations of constrained nodes or end-points 106 operationally connected to the server. The nodes and their web resources (path) along with other meta-data are registered with the Resource Directory either directly by the node, via a local proxy or by another third party. Thus, the Resource Directory is a registry of the resources below the server in the M2M network. This way the Resource Directory eliminates the need for management tools to probe the M2M network directly (which is very inefficient). The Resource Directory may be realized using a processor and a storing device such as a hard disc drive and a suitable application, for example. The Resource Directory may be realized as a database application in a computer or it may be realized using cloud computing.

In at least one disclosed embodiment, the server further comprises a Resource Cache 210. The Resource Cache is a temporary cache of the most recent representation (latest payload value) of node resources. The cache 210 is accessed any time the server receives a request for a resource. The cache is updated any time a response is made or a notification as a result of a subscription is received. This caching improves efficiency as subsequent requests for that resource are fetched internally rather than loading the constrained M2M network. The Resource Cache may be realized using a processor and a storing device such as a hard disc drive and a suitable application or as an application in a computer or it may be realized using cloud computing, for example.

In another disclosed embodiment, the server comprises a Resource Lookup 204 which is configured to provide a lookup interface for web applications and other internal components to discover end-points and resources. A web application or internal component may send a lookup request to the server and the Resource Lookup 204 is configured to handle these requests and reply with necessary information. With the knowledge of the domain, the end-point and a resource a web application or internal component can make a resource request. These requests are handled by a Resource Proxy 206 and the Resource Cache 210. The Resource Proxy is first configured to check if a local cached copy of the requested resource is available. If a valid copy is found, it may be sent as a reply. If the cache does not have a copy of the resource it is requested from the node via an M2M Connector 212. The Resource Lookup and Resource Proxy may be realized using a processor and a storing device such as a hard disc drive and a suitable application, for example. They may be realized as applications in a computer or using cloud computing.

Figure 3:
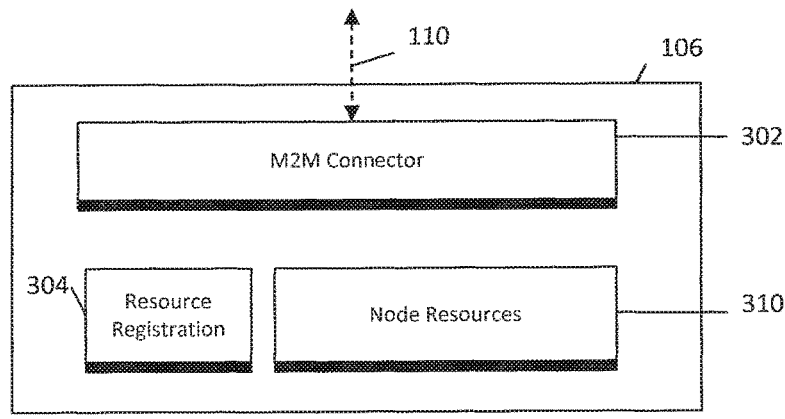
FIG. 3 illustrates an example of a node.

FIG. 3 shows an example of the structure of a node 106. A node has one or more device applications or interfaces, each controlling connection with a resource and registering resources with a Node Resources component 310. When the resources have been registered, the Resource Registration component 304 discovers the location of a Resource Directory for its appropriate domain (usually a server) and then registers itself and its resource over the M2M interface 110 using the M2M Connector 302.

Node or nodes may have resources of different types registered. A basic type of resource is one which may have a given value. A web application may request the node the value, the value is read utilizing the respective device application or interface and reported back to the web application typically immediately after receiving the request. An observable resource is a resource on a node that supports a special observation feature. The observation feature allows asynchronous notifications to be sent from the node to the server each time the resource changes.

In at least one disclosed embodiment, resources to be managed on a node are represented as web resources. Resources of the nodes may be defined as Uniform Resource Identifier web resource structure. A web resource is identified by a Uniform Resource Locator (URL). A Uniform Resource Locator is a Uniform Resource Identifier (URI) that specifies where a resource is available and the mechanism for retrieving the resource. An example of an URL is the address of a web page on the World Wide Web, such as http://www.example.com/.

Physically, a node may comprise a processor, a memory, a power source, a transceiver or a communication unit. The resources and interfaces to the resources may be realized with different techniques depending on the application. The resources may be realized using sensors, light sources, detectors, to name a few.

The nodes 106 of the system are configured to register their resources with the Resource Directory of a server 104. In at least one disclosed embodiment, the registration is performed using a REST interface containing query parameter meta-data and a body with a link description for each resource. The server stores the end-point, its resources and associated meta-data in the Resource Directory 210. Once the data is in the Resource Directory the data can be looked up and resources requested.

A server may receive a request from a web application regarding a resource of a node. The web application may request to receive a notification whenever an observable resource on a node changes. This may be called a subscription of a resource. In subscription, a server makes a special observe request, which results in a node to server notification each time the resource changes. Presently, the server has been configured to create a token, or identifier, to an observed resource and send information on the token to the node when informing the node about the subscription.

A problem affecting scalability in an M2M subscription system is the amount of state that both the server and a node or end-point need to keep about each observation for a resource. This is caused by the dynamic nature of the token used to identify the observation relationship. In the current state-of-the-art, the token is generated by the observer (the server in this case) and then stored by both the observer and the node resource during the life of the observation in order to match notifications. This also causes problems in load balanced clustered servers where dynamic tokens place tough requirements on state distribution between cluster nodes.

It is proposed to define a static ID for each resource of a node. The IDs of the resources of a node are unique within the node. This ID may be used in place of a dynamic token, and can also be used as a shortcut URI to make requests to the resource. The resource ID also allows the observation relationship to be optimized for resources that are known to be always subscribed to by a web application. A state-of-the-art observation requires that the server first performs a GET request with an observation field and a token identifying the resource and to be used for future notifications. In an embodiment, when a node registers a resource that is known to be subscribed, the registration message comprises an indication that the node is configured to send autonomously information to the server whenever the resource changes. The server is configured to store information that the resource as auto observable. Regarding these auto observable resources the above mentioned GET step is not needed. Instead the node automatically starts sending notifications using the resource ID as the token after the node has registered itself to the server.

In another disclosed embodiment, a resource ID can be any binary number. For example, the number may be an 8- or 16-bit binary number in order to maximize efficiency. The resource ID may be represented as a decimal or hexidecimal number in the link attribute parameter. A node can take several approaches to assigning resource IDs to resources. For example, the resource ID may be assigned to each resource through a configuration, or the resource IDs may be generated from the memory storage location of the resource storage table.

Figure 4:
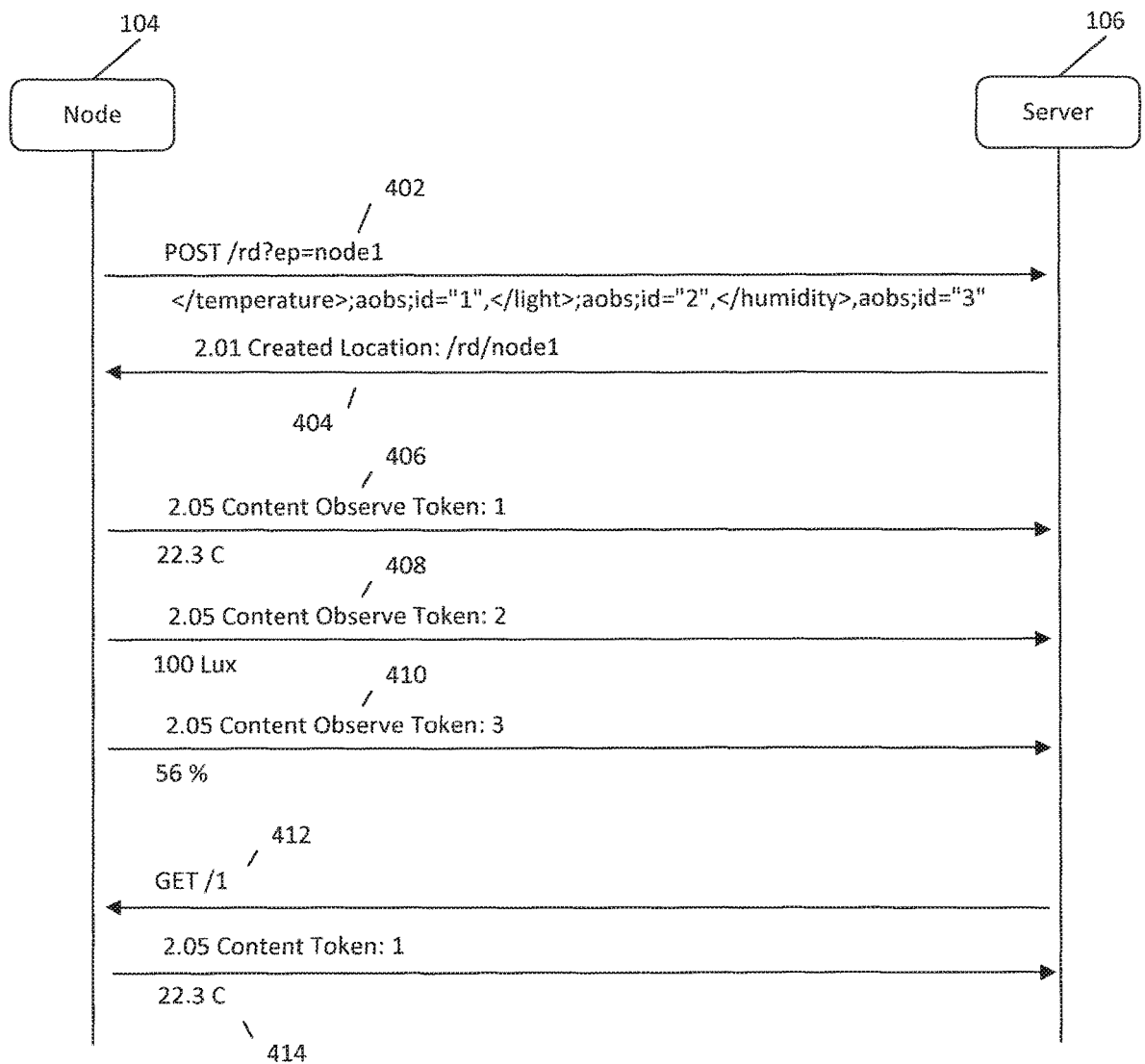
FIG. 4 shows an example of a message exchange diagram.

FIG. 4 shows an example of a message exchange diagram between a node 104 and a server 106 regarding the registration procedure of the node and observation following the registration.

When installed and powered up, the node 104 is configured to register itself to a network. It sends a registration message 402 to the Resource Directory of the server 106. An example of the message is as follows:

POST/rd?ep=node1</temperature>;aobs;id="1",</light>;aobs; id="2",</humidity>,aobs;id="3"

In at least one disclosed embodiment, the message comprises a list of resources of the node as links. In this example, the node comprises three resources, a temperature, light and humidity resource. Each resource definition comprises a resource ID denoted with id, the temperature resource having id=1, the light resource having id=2 and the humidity resource having id=3. Furthermore, the definition of each resource has a flag (in this example "aobs") indicating that the resource is auto observable. Generally a single node may have some resources that are auto observable and other resources that are not. However, all resources may have a resource ID.

The server receives the registration message, the node and the resources are registered in the Resource Directory. All resources marked for auto observation are automatically marked as observable to the server the node is registered with. The server is configured to send an acknowledgement 404 of the successful registration to the node. Likewise, a negative acknowledgement is sent in case of an error.

Once the node 104 has successfully registered with the server 106, it then enters a normal mode of operation where it waits for changes on observable resources or incoming requests. Every time a resource configured to be auto observable changes the node 104 is configured to send a notification 406, 408, 410 to the server 104. In the example, of FIG. 4, when the temperature changes the node sends a notification 406 to the server, the notification comprising the value of the temperature and the resource ID "1" as a token identifying the resource. In an embodiment, for any resource that has a resource ID, that ID is used as the token in a notification.

In another disclosed embodiment, the resource ID may also be used as a shortcut resource path when making requests to the node. In the example of FIG. 4, the server sends a GET request 412 to the node to obtain information on the temperature resource. The GET request is made to /1 instead of /temperature. The decision to use the short path form can be made by the web application requesting the resource or automatically by the resource proxy function of the server 106. The node is configured to send a notification 414 as a response to the request, the notification comprising the value of the temperature and the resource ID "1" as a token identifying the resource.

In yet another disclosed embodiment, the apparatus may be realized as software in a node, a server, a computer or a set of computers connected to Internet and a binary web service domain directly or via a proxy router or server.

The computer programs may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

It will be obvious to a person skilled in the art that, as technology advances, the inventive concept can be implemented in various ways. The disclosed embodiments are not limited to the examples described above but may vary within the scope of the claims.

The invention claimed is:

1. An apparatus comprising:
at least one processor; and
at least one memory including computer program code,
wherein the at least one memory and the computer program code configured to, with the at least one processor, cause the apparatus at least to communicate with at least one of a plurality of nodes operationally connected to the apparatus, wherein each of the plurality of nodes comprises a plurality of embedded node resources, wherein each of the embedded node resources is assigned a unique static ID within that node, and
wherein the communication includes receiving, from each of the plurality of nodes, a registration message that indicates the unique static ID for each of the plurality of embedded node resources for the node and an indication of which resources the node is configured to, autonomously send information about, in response to an auto-observable, embedded node resource value change, wherein the information to be autonomously sent includes an indication of the unique static ID of the auto-observable, embedded node resource.

2. The apparatus of claim 1, wherein the apparatus is configured to receive the autonomously sent information regarding the changed auto-observable, embedded node resource change together with the unique static ID of the auto-observable resource.

3. The apparatus of claim 1, further comprising:
an interface for communicating with web applications making use of the node resources; and
a component for receiving subscriptions regarding the information received from the nodes and providing the subscribed information.

4. The apparatus of claim 1, wherein the communication further comprises issuing a request to one of the plurality of nodes regarding an embedded resource of that node, wherein the request includes the unique static ID of the embedded node resource, and receiving, in response to the request, a notification of the value of the embedded node resource.

5. An apparatus comprising:
at least one processor; and
at least one memory including computer program code configured to, with the at least one processor, cause the apparatus at least to:
control connections to embedded node resources providing information;

store a unique static ID for each of the plurality of resources;

communicate, utilizing an interface, with a network element operationally connected to the apparatus;

send the network element a registration message that:
indicates the unique static ID for each of the resources of the node, wherein the unique static ID for each resource is unique within the node, and includes an indication of which resources the node is configured to autonomously send information about, in response to an auto-observable, embedded node resource value change, wherein the information to be autonomously sent indicates the unique static ID of the auto-observable, embedded node resource; and receive an acknowledgment from the network element indicating that the resource has been registered and marked as auto-observable.

6. The apparatus of claim 5, wherein the apparatus is configured to send the network element information autonomously regarding the changed auto-observable, embedded node resource together with the unique static ID of the auto-observable resource.

7. The apparatus of claim 5, wherein the apparatus is configured to respond to the request by transmitting requested information to the network element, the transmission comprising the unique static ID of the embedded node resource.

8. The apparatus of claim 5, further configured to receive a request regarding an embedded node resource of the apparatus, wherein the request includes the unique static ID of the embedded node resource, and send, in response to the request, a notification of the value of the embedded node resource.

9. A method comprising:
communicating with at least one of a plurality of nodes operationally connected to an apparatus using at least one processor of the apparatus,
wherein each of the plurality of nodes comprises a plurality of embedded node resources,
wherein each of the embedded node resources is assigned a unique static ID within that node, and
wherein the communication includes receiving, from each of the plurality of nodes, a registration message that indicates the unique static ID for each of the plurality of embedded node resources for the node, and an indication of which resources the node is configured to autonomously send information about, in response to an auto-observable, embedded node resource value change,
wherein the information to be autonomously sent includes an indication of the unique static ID of the auto-observable, embedded node resource, and
storing data indicating which embedded node resource is auto-observable.

10. The method of claim 9, further comprising receiving the autonomously sent information sent regarding the changed auto-observable, embedded node resource change together with the static ID of the auto-observable resource.

11. The method of claim 9, further comprising communicating with web applications making use of the resources of the nodes, and receiving subscriptions regarding the information received from the nodes and providing the subscribed information.

12. The method of claim 9, wherein the communication further comprises issuing a request to one of the plurality of nodes regarding an embedded resource of that node, wherein the request includes the unique static ID of the embedded node resource, and receiving, in response to the request, a notification of the value of the embedded node resource.

13. A method comprising:
controlling connections to each of a plurality of resources embedded in a node providing information;
storing a unique static ID for each of the plurality of resources;
communicating, utilizing an interface, with a network element operationally connected to the apparatus;
sending the network element a registration message that:
indicates the unique static ID for each of the resources of the node, wherein the unique static ID for each resource is unique within the node, and
includes an indication of which resources the node is configured to autonomously send information about, in response to an auto-observable, embedded node resource value change, wherein the information to be autonomously sent indicates the unique static ID of the auto-observable, embedded node resource; and
receiving an acknowledgment from the network element indicating that the resource has been registered with the unique static ID and marked as auto-observable.

14. The method of claim 13, further comprising sending the network element information autonomously regarding the changed auto-observable, embedded node resource together with the static ID of the auto-observable resource.

15. The method of claim 13, further comprising receiving, from the network element, a request regarding a resource, the request comprising the unique static ID of the embedded node resource, and responding to the request by transmitting requested information to the network element, the transmission comprising the unique static ID of the embedded node resource.

16. A non-transitory computer program product encoding a computer program of instructions for executing a computer process carrying out a method when the instructions are performed on a computer, wherein the method comprises:
controlling connections to each of a plurality of resources embedded in a node providing information;
storing a unique static ID for each of the plurality of resources;
communicating, utilizing an interface, with a network element operationally connected to the apparatus;
sending the network element a registration message that:
indicates the unique static ID for each of the resources of the node, wherein the unique static ID for each resource is unique within the node, and
includes an indication of which resources the node is configured to autonomously send information about, in response to an auto-observable, embedded node resource value change, wherein the information to be autonomously sent includes an indication of the unique static ID of the auto-observable, embedded node resource; and
receiving an acknowledgment from the network element indicating that the resource has been registered with the unique static ID and marked as auto-observable.

17. The non-transitory computer readable medium of claim 16, wherein the method further comprises: issuing a request to one of the plurality of nodes regarding an embedded resource of that node, wherein the request includes the unique static ID of the embedded node resource; and receiving, in response to the request, a notification of the value of the embedded node resource.

* * * * *